United States Patent
Steward et al.

(10) Patent No.: US 11,071,277 B2
(45) Date of Patent: Jul. 27, 2021

(54) PET BEDS AND AND METHODS OF MAKING AND USING THE SAME

(71) Applicant: EASTERN TECHNOLOGIES INC., Ashford, AL (US)

(72) Inventors: John Brian Steward, Sedona, AZ (US); Joni Percoski, Newport Coast, CA (US)

(73) Assignee: Eastern Technologies, Inc., Ashford, AL (US)

(*) Notice: Subject to any disclaimer, the term of this patent is extended or adjusted under 35 U.S.C. 154(b) by 316 days.

(21) Appl. No.: 16/351,892

(22) Filed: Mar. 13, 2019

(65) Prior Publication Data

US 2019/0289816 A1    Sep. 26, 2019

Related U.S. Application Data

(60) Provisional application No. 62/646,146, filed on Mar. 21, 2018.

(51) Int. Cl.
*A01K 1/035* (2006.01)

(52) U.S. Cl.
CPC .................. *A01K 1/0353* (2013.01)

(58) Field of Classification Search
CPC ...... A01K 1/0353; A47C 27/14; A47C 27/15; A47C 27/18
See application file for complete search history.

(56) References Cited

U.S. PATENT DOCUMENTS

| | | | | |
|---|---|---|---|---|
| 5,369,828 | A | * | 12/1994 | Graebe ............... A47C 4/54 5/654 |
| 10,357,115 | B2 | * | 7/2019 | Oh ............... A47C 27/144 |
| 2005/0084667 | A1 | * | 4/2005 | Landvik ............... B32B 5/18 428/316.6 |
| 2005/0224000 | A1 | * | 10/2005 | Holte ............... A61F 5/01 119/28.5 |
| 2011/0016635 | A1 | * | 1/2011 | Svensrud ............... A47C 27/146 5/724 |
| 2014/0237728 | A1 | * | 8/2014 | Oh ............... A47C 27/148 5/730 |
| 2015/0238378 | A1 | * | 8/2015 | Bhat ............... A47C 27/081 5/421 |
| 2015/0351557 | A1 | * | 12/2015 | Allen ............... A47C 27/144 5/655.5 |
| 2019/0053633 | A1 | * | 2/2019 | Rensink ............... A47C 27/148 |
| 2020/0029705 | A1 | * | 1/2020 | Fux ............... A47C 27/15 |

* cited by examiner

*Primary Examiner* — Kristen C Hayes
(74) *Attorney, Agent, or Firm* — Withers & Keys, LLC

(57) ABSTRACT

Pet beds are disclosed. Methods of making and using pet beds are also disclosed.

21 Claims, 3 Drawing Sheets

PET BEDS AND AND METHODS OF MAKING AND USING THE SAME

CROSS-REFERENCE TO RELATED APPLICATIONS

This patent application claims the benefit of priority to U.S. Provisional Patent Application Ser. No. 62/646,146 filed on Mar. 21, 2018 and entitled "PET BEDS AND METHODS OF MAKING AND USING THE SAME," the subject matter of which is hereby incorporated by reference in its entirety.

FIELD OF THE INVENTION

The present invention is directed to pet beds. The present invention is further directed to methods of making and using pet beds.

BACKGROUND

Efforts continue to further develop pet beds to provide comfort to one or more pets.

SUMMARY

The present invention addresses some of the difficulties and problems discussed above by the discovery of new pet beds.

Accordingly, the present invention is directed to pet beds. In one exemplary embodiment, the pet bed of the present invention comprises: (I) at least three layers of foam comprising: one or more central viscoelastic foam layers, one or more upper foam layers along an upper outer surface of said one or more central viscoelastic foam layers, and one or more lower foam layer along a lower outer surface of said one or more central viscoelastic foam layers, (II) a cover material covering at least a portion of said at least three layers of foam and forming an upper surface of said pet bed, said cover material comprising: at least one fabric layer positioned above said at least three layers of foam, and one or more film layers on at least one major outer surface of said at least one fabric layer; and (III) an anti-skid layer on a lower outer surface of said pet bed, wherein said pet bed provides orthopedic support for an animal positioned on said upper surface of said pet bed.

The present invention even further relates to methods of making pet beds. In one exemplary embodiment, the method of making a pet bed comprises: laminating at least three layers of foam to form an integral foam structure, the at least three layers of foam comprising: one or more central viscoelastic foam layers, one or more upper foam layers along an upper outer surface of the one or more central viscoelastic foam layers, and one or more lower foam layer along a lower outer surface of the one or more central viscoelastic foam layers; covering at least a portion of the integral foam structure with a cover material, the cover material covering at least a portion of said at least three layers of foam and forming an upper surface of said pet bed, said cover material comprising: at least one fabric layer positioned above said at least three layers of foam, and one or more film layers on at least one major outer surface of said at least one fabric layer; and providing an anti-skid layer on the lower outer surface of the pet bed.

The present invention even further relates to methods of using pet beds. In one exemplary embodiment, the method of using a pet bed comprises positioning a pet bed along a surface (e.g., the floor of a home), the pet bed comprising: (I) at least three layers of foam comprising: one or more central viscoelastic foam layers, one or more upper foam layers along an upper outer surface of the one or more central viscoelastic foam layers, and one or more lower foam layer along a lower outer surface of the one or more central viscoelastic foam layers, (II) a cover material covering at least a portion of the at least three layers of foam and forming an upper surface of the pet bed, the cover material comprising: at least one fabric layer positioned above the at least three layers of foam, and one or more film layers on at least one major outer surface of the at least one fabric layer; and (III) an anti-skid layer on a lower outer surface of the pet bed, wherein the pet bed provides orthopedic support for an animal positioned on the upper surface of the pet bed; and allowing a pet to have access to the pet bed.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to pet beds. The present invention is further directed to methods of making pet beds. The present invention is even further directed to methods of using pet beds.

In some embodiments, the pet beds of the present invention comprise one or more of the following features: (1) foam layers having anti-smoldering properties (i.e., fire resistance); (2) a cover material that at least partially (and preferably completely) covers the foam layers; (3) an anti-skid component along a bottom surface of the pet bed; and (4) a cover material that is splash resistant, mold resistant, and mildew resistant.

Figure 1:
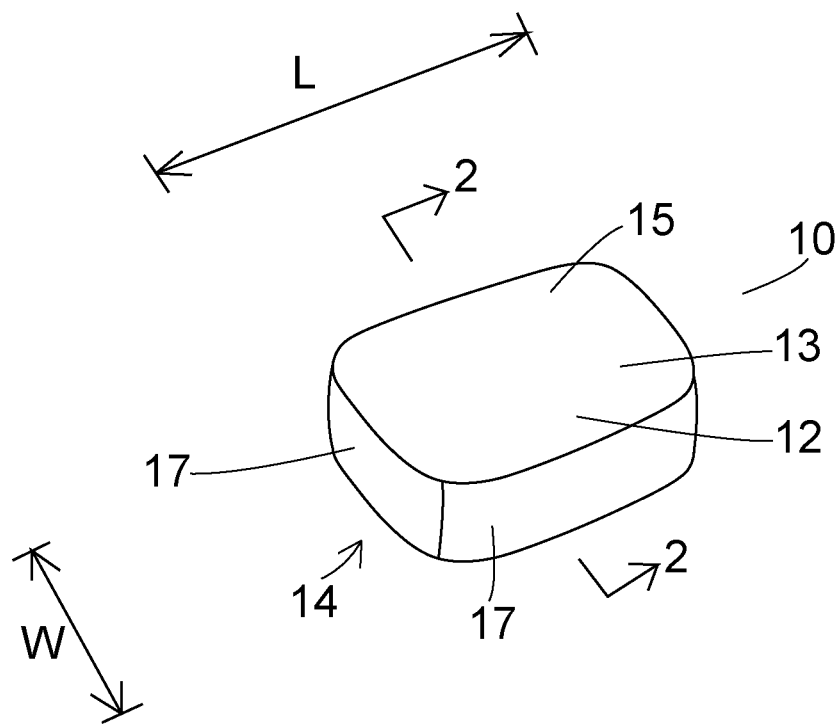
FIG. 1 depicts a perspective view of an exemplary pet bed of the present invention.
Figure 2:
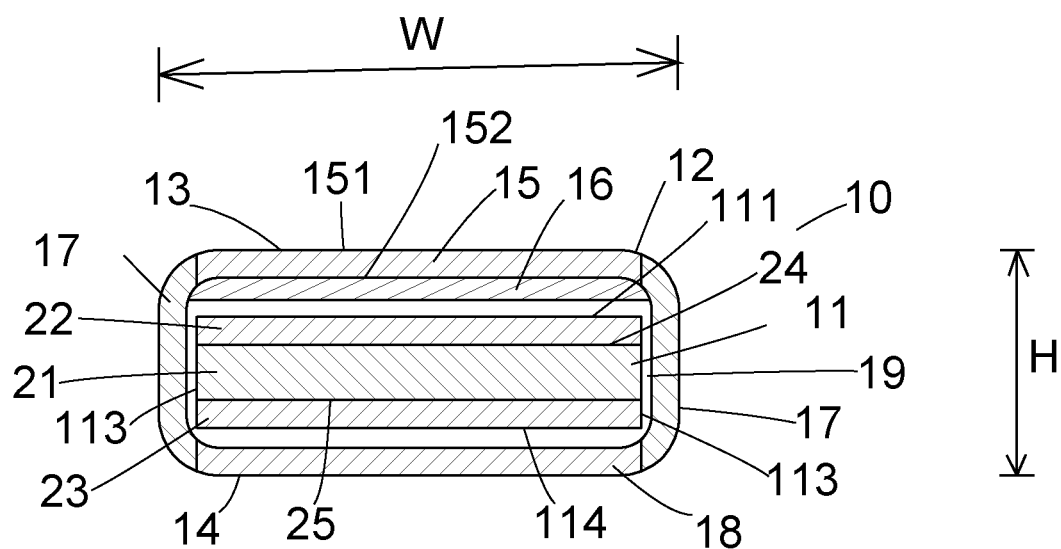
FIG. 2 depicts a cross-sectional view of the exemplary pet bed shown in FIG. 1 as viewed along line 2-2 shown in FIG. 1.

An exemplary pet bed 10 of the present invention is shown in FIGS. 1-2. As shown in FIGS. 1-2, exemplary pet bed 10 comprises: (I) at least three layers of foam 11 comprising: (A) one or more central viscoelastic foam layers 21, (B) one or more upper foam layers 22 along an upper outer surface 24 of the one or more central viscoelastic foam layers 21, and (C) one or more lower foam layers 23 along a lower outer surface 25 of the one or more central viscoelastic foam layers 21; (II) a cover material 12 covering at least a portion of the at least three layers of foam 11 and forming an upper surface 13 of the pet bed 10, the cover material 12 comprising: (A) at least one fabric layer 15 positioned above the at least three layers of foam 11, and (B) one or more film layers 16 on at least one major outer surface 151/152 (i.e., major upper fabric surface 151 and/or major lower fabric surface 152) of the at least one fabric layer 12; and (III) an anti-skid layer 18 on a lower outer surface 14 of the pet bed 10. As shown in FIGS. 1-2 and discussed further below, exemplary pet bed 10 may have any desired length L, width W, and height H, as well as any overall shape (e.g., circular, square, rectangular, etc.).

Figure 3:
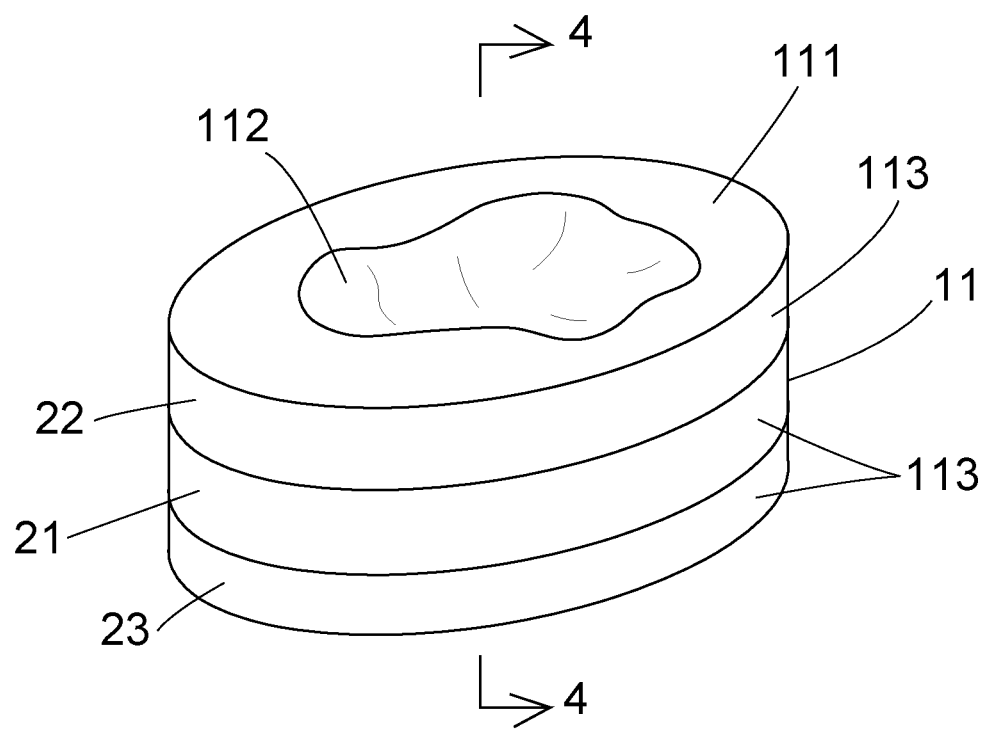
FIG. 3 depicts a top view of an exemplary contoured upper surface of another exemplary pet bed of the present invention.
Figure 4:
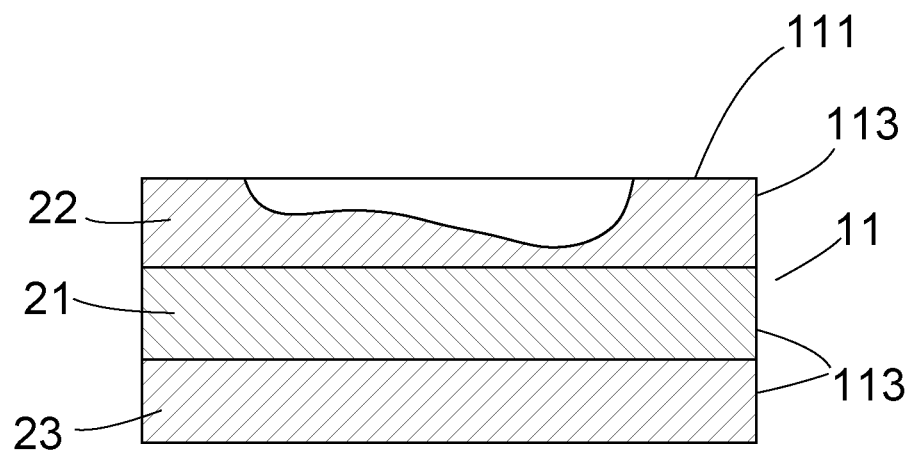
FIG. 4 depicts a cross-sectional view of the exemplary pet bed shown in FIG. 3 as viewed along line 4-4 shown in FIG. 3.
Figure 5:
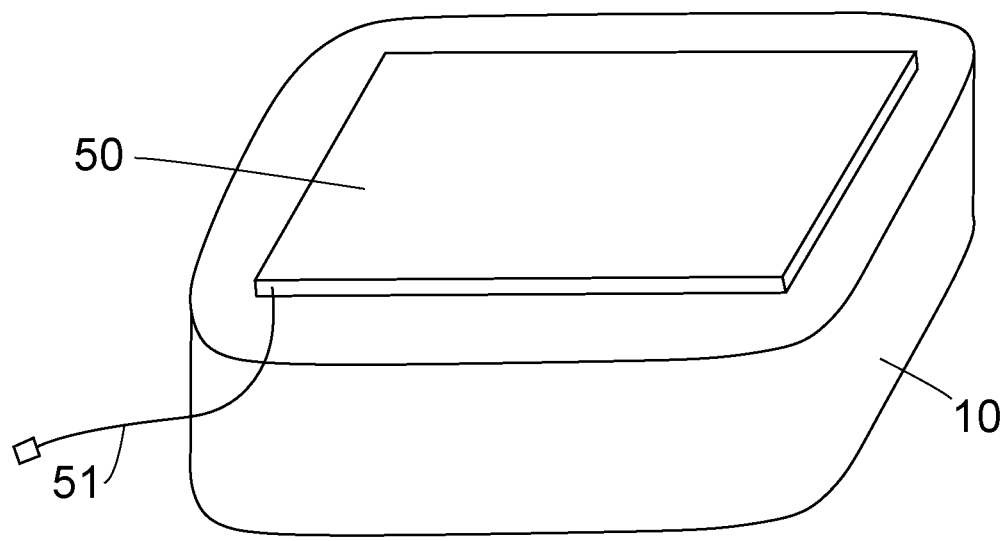
FIG. 5 depicts a perspective view of the exemplary pet bed shown in FIG. 1 with an exemplary heating element positioned along an upper surface of the exemplary pet bed.
Figure 6:
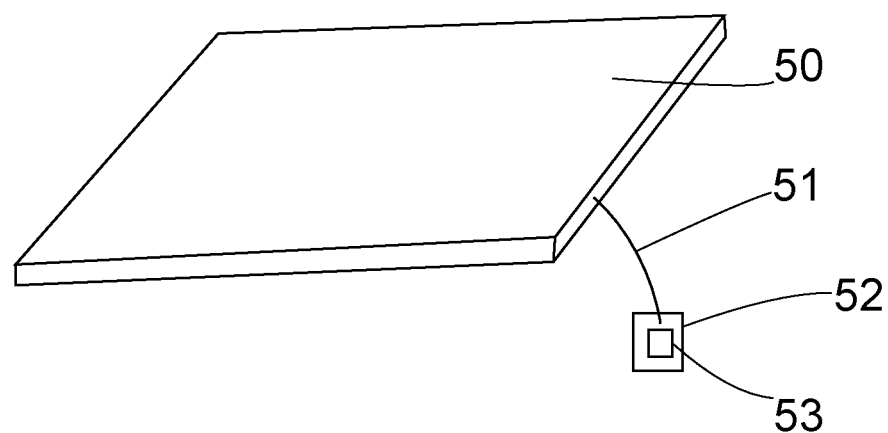
FIG. 6 depicts components of an exemplary heating element suitable for use with the pet beds of the present invention.

As shown in FIGS. 3-4 and discussed further below, some pet beds of the present invention, such as exemplary pet bed 10, may further comprise a contoured surface shape 112 within an upper surface 111 of the at least three layers of foam 11.

The pet beds and methods of the present invention are further described in the following embodiments.

Other Embodiments

Pet Beds

1. A pet bed 10 comprising: (I) at least three layers of foam 11 comprising: (A) one or more central viscoelastic foam layers 21, (B) one or more upper foam layers 22 along an upper outer surface 24 of said one or more central viscoelastic foam layers 21, and (C) one or more lower foam layers 23 along a lower outer surface 25 of said one or more central viscoelastic foam layers 21, (II) a cover material 12 covering at least a portion of said at least three layers of foam 11 and forming an upper surface 13 of said pet bed 10, said cover material 12 comprising: (A) at least one fabric layer 15 positioned above said at least three layers of foam 11, and (B) one or more film layers 16 on at least one major outer surface 151/152 (i.e., major upper fabric surface 151 and/or major lower fabric surface 152) of said at least one fabric layer 12; and (III) an anti-skid layer 18 on a lower outer surface 14 of said pet bed 10, wherein said pet bed 10 provides orthopedic support for an animal (not shown) positioned on said upper surface 13 of said pet bed 10. As used herein, the phrase "one or more," when used to describe one or more foam layers, fabric layers, film layers, coating layers, etc., typically refers to from one to about eight layers (or any number between 1 and 8).

2. The pet bed 10 of embodiment 1, wherein each of said one or more central viscoelastic foam layers 21 has a higher density compared to each of said one or more upper foam layers 22 and said one or more lower foam layers 23.

3. The pet bed 10 of embodiment 1 or 2, wherein each of said one or more central viscoelastic foam layers 21 independently has a density ranging from about 2.50 lb/ft$^3$ to about 3.60 lb/ft$^3$ (or any value between 2.50 and 3.60, in increments of 0.01, e.g., 2.76, or any range of values between 2.50 and 3.60, in increments of 0.01, e.g., from about 2.80 to about 3.25), and each of said one or more upper foam layers 22 and said one or more lower foam layers 23 independently has a density ranging from about 1.00 lb/ft$^3$ to about 2.00 lb/ft$^3$ (or any value between 1.00 and 2.00, in increments of 0.01, e.g., 1.45, or any range of values between 1.00 and 2.00, in increments of 0.01, e.g., from about 1.40 to about 1.80).

4. The pet bed 10 of any one of embodiments 1 to 3, wherein each of said one or more central viscoelastic foam layers 21 independently has a density ranging from about 2.80 lb/ft$^3$ to about 3.25 lb/ft$^3$, and each of said one or more upper foam layers 22 and said one or more lower foam layers 23 independently has a density ranging from about 1.30 lb/ft$^3$ to about 1.60 lb/ft$^3$.

5. The pet bed 10 of any one of embodiments 1 to 4, wherein each of said one or more central viscoelastic foam layers 21 has an Indentation Force Deflection (IFD) value at 25% deflection 4" as measured using ASTM D3574 of from about 5.0 lbs/50 in to about 15.0 lbs/50 in (or any value between 5.0 and 15.0, in increments of 0.1, e.g., 6.8, or any range of values between 5.0 and 15.0, in increments of 0.1, e.g., from about 7.5 to about 12.3), and each of said one or more upper foam layers 22 and said one or more lower foam layers 23 independently has an IFD value at 25% deflection 4" as measured using ASTM D3574 of from about 16.0 lbs/50 in to about 30.0 lbs/50 in (or any value between 16.0 and 30.0, in increments of 0.1, e.g., 16.8, or any range of values between 16.0 and 30.0, in increments of 0.1, e.g., from about 17.5 to about 22.3).

6. The pet bed 10 of any one of embodiments 1 to 5, wherein each of said one or more central viscoelastic foam layers 21 has an Indentation Force Deflection (IFD) value at 25% deflection 4" as measured using ASTM D3574 of from about 7.0 lbs/50 in to about 13.0 lbs/50 in, and each of said one or more upper foam layers 22 and said one or more lower foam layers 23 independently has an IFD value at 25% deflection 4" as measured using ASTM D3574 of from about 19.0 lbs/50 in to about 25.0 lbs/50 in.

7. The pet bed 10 of any one of embodiments 1 to 6, wherein one or more foam layers 21/22/23 are fire resistant as measured by passing at least one of: (i) Cal 117-2013 smolder test and (ii) NFPA 260 test. In some desired embodiments, each of said one or more upper foam layers 22 and said one or more lower foam layers 23 has the properties as shown in Table 1 below:

TABLE 1

Properties of a Desired Foam For Forming Each of The One or More Upper Foam Layers 22 and The One or More Lower Foam Layers 23

| Property | Value/Units | Test Method Used |
|---|---|---|
| Density | 1.20-1.80 lbs/ft$^3$ | ASTM D3574 |
| IFD @ 25% Deflection 4" | 19.00-25.00 lbs/50 in$^2$ | ASTM D3574 |
| Elongation | 100% minimum | ASTM D3574 |
| Tensile Strength | 10 lbs/in$^3$ minimum | ASTM D3574 |
| Tear Resistance | 1.00 lbs/lineal inch minimum | ASTM D3574 |
| Support Factor | 1.80 minimum | |
| Color | white | |
| Bio-Polyol | yes | |
| Smolder Resistant | Pass | Cal 117-2013 (smolder)/NFPA260 |

In some desired embodiments, each of said one or more central viscoelastic foam layers 21 has the properties as shown in Table 2 below:

TABLE 2

Properties of a Desired Foam For Forming Each of The One or More Central Viscoelastic Foam Layers 21

| Property | Value/Units | Test Method Used |
|---|---|---|
| Density | 2.80-3.25 lbs/ft$^3$ | ASTM D3574 |
| IFD @ 25% Deflection 4" | 7.00-13.00 lbs/50 in$^2$ | ASTM D3574 |
| Elongation | 100% minimum | ASTM D3574 |
| Tensile Strength | 10 lbs/in$^3$ minimum | ASTM D3574 |
| Tear Resistance | 1.00 lbs/lineal inch minimum | ASTM D3574 |
| Support Factor | N/A | |
| Color | white | |
| Bio-Polyol | yes | |
| Smolder Resistant | Pass | Cal 117-2013 (smolder)/NFPA260 |
| viscoelastic | yes | |
| Air flow | 3.0 minimum | ASTM D3574 |

8. The pet bed 10 of any one of embodiments 1 to 7, wherein each foam layer 21/22/23 independently has a foam layer thickness of from about 0.5 inch (in) to about 4.0 in (or any value between 0.5 and 4.0, in increments of 0.1, e.g., 0.8, or any range of values between 0.5 and 4.0, in increments of 0.1, e.g., from about 1.5 to about 2.3).

9. The pet bed 10 of any one of embodiments 1 to 8, wherein each of said one or more central viscoelastic foam layers 21 independently has a foam layer thickness of from about 0.5 in to about 3.0 in, and each of said one or more upper foam layers 22 and said one or more lower foam layers 23 independently has a foam layer thickness of from about 0.5 in to about 3.0 in.

10. The pet bed 10 of any one of embodiments 1 to 9, wherein each foam layer 21/22/23 comprises a polyurethane foam.

11. The pet bed 10 of any one of embodiments 1 to 10, wherein said one or more upper foam layers 22 and said one or more lower foam layers 23 are identical with regard to foam composition (i.e., the same foam material).

12. The pet bed 10 of any one of embodiments 1 to 11, wherein said upper surface 111 of said at least three layers of foam 11 has therein a contoured surface shape 112, said contoured surface shape 112 providing additional orthopedic support for an animal (not shown). It should be understood that contoured surface shape 112 may have any desired shape embedded within said upper surface 111 of said at least three layers of foam 11. Suitable shapes include, but are not limited to, an oval shape, a circular shape, a shape having multiple, a constant depth along/within the shape, different depths along/within the shape, multiple shape parts (e.g., two or more shapes side-by-side), or any combination thereof.

13. The pet bed 10 of embodiment 12, wherein said contoured surface shape 112 is within (i) said one or more upper foam layers 22, or (ii) said one or more upper foam layers 22 and said one or more central viscoelastic foam layers 21.

14. The pet bed 10 of any one of embodiments 1 to 13, wherein said at least one fabric layer 15 comprises at least one polyester knit or woven fabric, and said one or more film layers 16 comprises at least one polyurethane film.

15. The pet bed 10 of any one of embodiments 1 to 14, wherein said one or more film layers 16 comprises at least one polyurethane film positioned along a lower major outer surface 152 of said at least one fabric layer 15 (i.e., adjacent upper surface 111 of at least three layers of foam 11).

16. The pet bed 10 of any one of embodiments 1 to 15, wherein each of said one or more film layers 16 contains (i) anti-microbial material, (ii) fire retardant material, or (iii) both (i) and (ii).

17. The pet bed 10 of any one of embodiments 1 to 16, wherein said cover material 12 comprises a polyester knit fabric 15 coated with a polyurethane film layer 16, said cover material 12 having properties as described in Table 3 below:

TABLE 3

Properties of Suitable Cover Materials 12

| | TESTING ITEM | SPECIFICATION | Formaldehyde Free TESTING METHOD |
|---|---|---|---|
| | REACH COMPLIANT | Pass | |
| | RoHS COMPLIANT | Pass | CPSAI Section 101 |
| | MOISTURE VAPOR TRANSMISSION | 130 gsm/24 hrs | ASTM E 96 BW |
| | WEIGHT | 5.3 oz/sq yd +/− 1/2 oz/sq yd | ASTM D3776 Option C |
| | FR | Pass | CAL 117 - 2013 |
| Antifungal | | Contact Inhibition 99% + | AATCC30-2004 *Aspergillus Niger* |
| Antibacterial | | Contact Inhibition 99% + | AATCC 147-2004 *Staphylococcus Aureus* |
| | BURST | 31.3 lbs | ASTM D 751 procedure A |
| | HALOGEN FREE | | IEC 62321: 2008 |
| | Cadmium | ND | |
| | Lead | ND | |
| | Mercury | ND | |
| | Hex Chromium | ND | |
| | PBB's (10) | ND | |
| | PBDEs (10) | ND | |
| | Chlorine | ND | BS EN 14582: 2007 |
| | Bromine | ND | |
| | Flourine | ND | |

TABLE 3-continued

Properties of Suitable Cover Materials 12

|  | TESTING ITEM | SPECIFICATION | Formaldehyde Free TESTING METHOD |
|---|---|---|---|
|  | Iodine | ND |  |
|  | Antimony | ND | EN71 Part 3: 1994 |
|  | Lead | ND | Amendment |
|  | Cadmium | ND | A1: 2000/AC: 2002 |
|  | Chromium | ND |  |
|  | Barium | ND |  |
|  | Mercury | ND |  |
|  | Selenium | ND |  |
|  | Arsenic | ND |  |
|  | Melamine | ND | CAS No. 000108-78-1 |
|  | Bisphenol A (BPA) | ND | US EPA 3540 |
| PHTHALATE FREE | DBP | ND | EN 14372: 2004 CPSIA |
|  | BBP | ND | Section 101 |
|  | DEHP | ND |  |
|  | DNOP | ND |  |
|  | DINP | ND |  |
|  | DIDP | ND |  |
| ADHESION OF COATING |  | 1.76 lbs | FTMS 191A S100 |
| CIGARETTE IGNITION |  | Meets Test Criteria - Class A | 16 CFR Part 1632.6 (1-1-94) |
| TEAR STRENGTH | Warp | 10.7 lbs. | Tongue Method |
|  | Weft | No Tear | FTMS 191A 5134 |
| BREAKING STRENGTH | Warp | 111.1 lbs. CV = 2.0% | Grab Method FTMS 191A |
|  | Weft | 77.2 lbs. CV = 3.4% | 5100 |
| STRENGTH AND ELONGATION BREAKING OF WOVEN CLOTH: |  |  |  |
| Breaking Strength | Warp | 66.4 lbs. | Cut Strip Method |
|  | Weft | 41.4 lbs. |  |
| Elongation at Break | Warp | 74.2% |  |
|  | Weft | 170.1% |  |
| Elongation at 10 Lbs. | Warp | 31% |  |
|  | Weft | 105.3% |  |
| Elongation at 20 Lbs. | Warp | 41.8% |  |
|  | Weft | 130.7% |  |

| STRETCH PROPERTIES (FABRIC GROWTH, %): |  | Time Interval (60 secs.) | Time Interval (1 hour) | ASTM D 2594-99 |
|---|---|---|---|---|
| Direction | Warp | 2.00% | 1.00% |  |
|  | Weft | 3.90% | 1.50% |  |

| ADHESION OF COATING |  | 4.7 lbs/inch | Adhesive Method ASTM D 751-06 Sections 45-48 |
|---|---|---|---|
| Antifungal |  | Contact Inhibition 99% + | AATCC30- 1988 *Aspergillus Niger* |
| Antibacterial |  | Contact Inhibition 99% + | AATCC 147- 1988 *Staphylococcus Aureus* |
| ABRASION RESISTANCE |  | 2457.5 Cycles to Perforation | FTMS 191A 5100 |
| WATER RESISTANCE - HIGH PRESSURE - PSI |  | 191.5 LBS | CGSB-4.2 NO. 26.5-M89 |
| Free Formaldehyde Concentration (ppm) |  | 1 0 CV 141.4% | AATTC 112- 2003 |
| BLOCKING |  | No Blocking | FTMS 5872 |
| SPRAY RATING |  | 0 | AATCC 22: 1996 |

18. The pet bed 10 of any one of embodiments 1 to 17, wherein said cover material 12 covers all of said upper surface 111 of said at least three layers of foam 11.

19. The pet bed 10 of any one of embodiments 1 to 18, wherein said cover material 12 covers all side surfaces 113 of said at least three layers of foam 11.

20. The pet bed 10 of any one of embodiments 1 to 19, wherein said cover material 12 covers a lower surface 114 of said at least three layers of foam 11.

21. The pet bed 10 of any one of embodiments 1 to 19, wherein said anti-skid layer 18 covers a lower surface 114 of said at least three layers of foam 11.

22. The pet bed 10 of any one of embodiments 1 to 21, wherein said anti-skid layer 18 comprises a polyvinyl chloride (PVC) coated polyester knit fabric. In some desired embodiments, said anti-skid layer 18 has the properties as shown in Table 4 below:

TABLE 4

Properties of a Suitable Anti-Skid Layer 18

| Property | Description |
| --- | --- |
| construction | 2-ply non-skid PVC coated polyester knit fabric |
| weight | 16 oz/yd$^2$ |
| Initial width | 54 in. |
| thickness | 0.035 in. |
| Flame Resistance | yes |
| Color | black |

23. The pet bed 10 of any one of embodiments 1 to 22, wherein said pet bead 10 further comprises a heating element 50 positioned along or under said upper surface 13 of said pet bed 10. In some embodiments, the heating element 50 will be a high capacity, battery powered heating element 50, with a rechargeable battery or batteries 51, and a thermostatically controlled heating element 50.

24. The pet bed 10 of any one of embodiments 1 to 23, wherein said pet bead 10 further comprises a heating element 50 positioned along said upper surface 13 of said pet bed 10.

25. The pet bed 10 of embodiment 23 or 24, wherein said heating element 50 comprises an electrically heated unit 50.

26. The pet bed 10 of any one of embodiments 23 to 25, wherein said heating element 50 further comprises an electrical cord 51 that is connectable to a 120 volt wall socket (not shown).

27. The pet bed 10 of embodiment 26, wherein said electrical cord 51 is animal-proof, resisting puncture or cutting by an animal (not shown).

28. The pet bed 10 of any one of embodiments 23 to 25, wherein said heating element 50 further comprises a battery pack 52 and one or more batteries 53 sized to supply power to said heating element 50.

29. The pet bed 10 of embodiment 28, wherein said battery pack 52 is positioned within said cover material 12.

30. The pet bed 10 of any one of embodiments 1 to 29, wherein said pet bed 10 or any component thereof (e.g., any one of foam layers 21/22/23, cover material 12, anti-skid layer 18, etc.) independently has fire resistance and/or flame retardant properties, antimicrobial properties, water resistance, or any combination thereof.

31. The pet bed 10 of any one of embodiments 1 to 30, wherein said pet bed 10 has an overall length L ranging from about 1.5 feet (ft) to about 8.0 ft, and overall width W ranging from about 1.0 ft to about 8.0 ft, and an overall height H ranging from about 2.0 in to about 24.0 in.

32. The pet bed 10 of any one of embodiments 1 to 31, wherein said pet bed 10 has an overall length L ranging from about 1.5 ft to about 4.0 ft, and overall width W ranging from about 1.0 ft to about 4.0 ft, and an overall height H ranging from about 2.0 in to about 4.0 in.

Methods of Making Pet Beds

33. A method of making the pet bed 10 of any one of embodiments 1 to 32, said method comprising: laminating the at least three layers of foam 21/22/23 to form an integral foam structure 11; covering at least a portion of the integral foam structure 11 with the cover material 12; and providing the anti-skid layer 18 on the lower outer surface 14 of the pet bed 10.

34. The method of embodiment 33, wherein said covering step comprises covering an upper surface 111 and side surfaces 113 of the integral foam structure 11 with the cover material 12.

35. The method of embodiment 33 or 34, wherein said covering step comprises completely encompassing the integral foam structure 11 within the cover material 12.

36. The method of any one of embodiments 33 to 35, wherein said providing step comprises attaching the anti-skid layer 18 to (i) the integral foam structure 11, (ii) the cover material 12, or (iii) both (i) and (ii). It should be understood that any attaching method may be used. Suitable attaching methods include, but are not limited to, sewing, stitching, gluing, heat bonded, welding, mechanically fastening (e.g., using VELCRO™ strips), etc., or any combination thereof.

37. The method of any one of embodiments 33 to 36, further comprising: shaping the integral foam structure 11 so as to form a contoured surface shape 112 along and within an upper surface 111 of the integral foam structure 11. For example, a foam computer numerical control (CNC) machine may be used to contour or shape one or more of the upper foam layers 22.

38. The method of any one of embodiments 33 to 37, further comprising: cutting one or more foam layers 21/22/23 within the at least three layers of foam 11 to provide a desired length L and width W for each of the one or more foam layers 21/22/23.

39. The method of any one of embodiments 33 to 38, further comprising: incorporating therein or coating thereon, any component of the pet bed 10 (e.g., any one of foam layers 21/22/23, any layer or surface of cover material 12, any layer or surface of anti-skid layer 18, etc.), one or more of: a fire resistance additive, a flame retardant, an antimicrobial additive, a water resistant additive, or any combination thereof.

40. The method of any one of embodiments 33 to 39, further comprising: incorporating therein or thereon, a heating element 50 suitable for providing heat to an animal (not shown) positioned on the pet bed 10.

Methods of Using Pet Beds

41. A method of using the pet bed 10 of any one of embodiments 1 to 32, said method comprising: positioning the pet bed 10 along a surface (not shown); and allowing a pet (not shown) to have access to the pet bed 10.

42. The method of embodiment 41, further comprising: turning on a heating element 50 suitable for providing heat to an animal (not shown) positioned on the pet bed 10.

43. The method of embodiment 41 or 42, further comprising: plugging an electrical cord 51 of the heating element 50 into a 120 volt wall socket (not shown).

44. The method of embodiment 43, wherein the electrical cord 51 is animal-proof, resisting puncture or cutting by an animal (not shown).

45. The method of any one of embodiments 42 to 44, wherein said turning on step comprises switching on the heating element 50, the heating element 50 comprising a battery pack 52 and one or more batteries 53 sized to supply power to the heating element 50.

46. The method of embodiment 45, further comprising: recharging the one or more batteries 53.

47. The method of any one of embodiments 41 to 46, further comprising: separating the cover material 12 from at least three layers of foam 11; and washing the cover material 12 in a standard household washing machine (not shown).

It should be understood that although the above-described pet beds, and methods are described as "comprising" one or more components or steps, the above-described compositions, and methods may "comprise," "consists of," or "consist essentially of" any of the above-described components or steps of the compositions, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a pet bed and/or method that "comprises" a list of elements (e.g., components or steps) is not necessarily limited to only those elements (or components or steps), but may include other elements (or components or steps) not expressly listed or inherent to the pet bed and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a pet bed and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described pet beds, and methods may comprise, consist essentially of, or consist of any of the herein-described components and features, as shown in the figures with or without any feature(s) not shown in the figures. In other words, in some embodiments, the pet beds and/or methods of the present invention do not have any additional features other than those shown in the figures, and such additional features, not shown in the figures, are specifically excluded from the pet beds and/or methods. In other embodiments, the pet beds and/or methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Pet beds as described in embodiments 1 to 47 and as shown in the figures were prepared.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A pet bed comprising:
at least three layers of foam comprising:
one or more central viscoelastic foam layers,
one or more upper foam layers along an upper outer surface of said one or more central viscoelastic foam layers, and
one or more lower foam layer along a lower outer surface of said one or more central viscoelastic foam layers, and
a cover material covering at least a portion of said at least three layers of foam and forming an upper surface of said pet bed, said cover material comprising:
at least one fabric layer positioned above said at least three layers of foam, and
one or more film layers on at least one major outer surface of said at least one fabric layer; and
an anti-skid layer on a lower outer surface of said pet bed, wherein (1) said pet bed provides orthopedic support for an animal positioned on said upper surface of said pet bed, (2) each of said one or more central viscoelastic foam layers has a higher density compared to each of said one or more upper foam layers and said one or more lower foam layers, and (3) said one or more upper foam layers and said one or more lower foam layers are identical with regard to foam composition.

2. The pet bed of claim 1, wherein each of said one or more central viscoelastic foam layers independently has a density ranging from about 2.50 $lb/ft^3$ to about 3.60 $lb/ft^3$, and each of said one or more upper foam layers and said one or more lower foam layers independently has a density ranging from about 1.00 $lb/ft^3$ to about 2.00 $lb/ft^3$.

3. The pet bed of claim 2, wherein each of said one or more central viscoelastic foam layers has an Indentation Force Deflection (IFD) value at 25% deflection 4" as measured using ASTM D3574 of from about 5.0 lbs/50 in to about 15.0 lbs/50 in, and each of said one or more upper foam layers and said one or more lower foam layers independently has an IFD value at 25% deflection 4" as measured using ASTM D3574 of from about 16.0 lbs/50 in to about 30.0 lbs/50 in.

4. The pet bed of claim 1, wherein each foam layer independently has a foam layer thickness of from about 0.5 inch (in) to about 4.0 in.

5. The pet bed of claim 1, wherein each foam layer comprises a polyurethane foam.

6. The pet bed of claim 1, wherein said upper surface of said at least three layers of foam has therein a contoured surface shape, said contoured surface shape providing additional orthopedic support for an animal.

7. The pet bed of claim 6, wherein said contoured surface shape is within (i) said one or more upper foam layers, or (ii) said one or more upper foam layers and said one or more central viscoelastic foam layers.

8. The pet bed of claim 1, wherein said at least one fabric layer comprises at least one polyester knit or woven fabric, and said one or more film layers comprises at least one polyurethane film.

9. The pet bed of claim 1, wherein said one or more film layers comprises at least one polyurethane film positioned along a lower major outer surface of said at least one fabric layer.

10. The pet bed of claim 1, wherein each of said one or more film layers contains (i) anti-microbial material, (ii) fire retardant material, or (iii) both (i) and (ii).

11. The pet bed of claim 1, wherein said cover material covers (i) all of said upper surface of said at least three layers of foam, (ii) all side surfaces of said at least three layers of foam; (iii) a lower surface of said at least three layers of foam; or (iv) any combination of (i), (ii) and (iii).

12. The pet bed of claim 1, wherein said anti-skid layer covers a lower surface of said at least three layers of foam.

13. The pet bed of claim 1, wherein said anti-skid layer comprises a polyvinyl chloride (PVC) coated polyester knit fabric.

14. The pet bed of claim 1, wherein said pet bead further comprises a heating element positioned along or under said upper surface of said pet bed.

15. The pet bed of claim 14, wherein said heating element further comprises (i) an electrical cord that is connectable to a 120 volt wall socket, wherein said electrical cord is animal-proof resisting puncture or cutting by an animal; (ii) a battery pack and one or more batteries sized to supply power to said heating element; or (iii) both (i) and (ii).

16. The pet bed of claim 1, wherein said pet bed or any component thereof independently has fire resistance, flame retardant properties, antimicrobial properties, water resistance, or any combination thereof.

17. The pet bed of claim 1, wherein said pet bed has an overall length L ranging from about 1.5 feet (ft) to about 8.0 ft, and overall width W ranging from about 1.0 ft to about 8.0 ft, and an overall height H ranging from about 2.0 in to about 24.0 in.

18. A pet bed comprising:
at least three layers of foam comprising:
one or more central viscoelastic foam layers,
one or more upper foam layers along an upper outer surface of said one or more central viscoelastic foam layers, and
one or more lower foam layer along a lower outer surface of said one or more central viscoelastic foam layers, and
a cover material covering at least a portion of said at least three layers of foam and forming an upper surface of said pet bed, said cover material comprising:
at least one fabric layer positioned above said at least three layers of foam, and
one or more film layers on at least one major outer surface of said at least one fabric layer; and
an anti-skid layer on a lower outer surface of said pet bed,
wherein (1) said pet bed provides orthopedic support for an animal positioned on said upper surface of said pet bed, and (2) said at least one fabric layer comprises at least one polyester knit or woven fabric, and said one or more film layers comprises at least one polyurethane film.

19. The pet bed of claim 18, wherein (1) each of said one or more central viscoelastic foam layers has a higher density compared to each of said one or more upper foam layers and said one or more lower foam layers, (2) said one or more upper foam layers and said one or more lower foam layers are identical with regard to foam composition, and (3) said pet bed or any component thereof independently has fire resistance, flame retardant properties, antimicrobial properties, water resistance, or any combination thereof.

20. A pet bed comprising:
at least three layers of foam comprising:
one or more central viscoelastic foam layers,
one or more upper foam layers along an upper outer surface of said one or more central viscoelastic foam layers, and
one or more lower foam layer along a lower outer surface of said one or more central viscoelastic foam layers, and
a cover material covering at least a portion of said at least three layers of foam and forming an upper surface of said pet bed, said cover material comprising:
at least one fabric layer positioned above said at least three layers of foam, and
one or more film layers on at least one major outer surface of said at least one fabric layer;
an anti-skid layer on a lower outer surface of said pet bed; and
a heating element positioned along or under said upper surface of said pet bed,
wherein said pet bed provides orthopedic support for an animal positioned on said upper surface of said pet bed.

21. The pet bed of claim 20, wherein said heating element further comprises (i) an electrical cord that is connectable to a 120 volt wall socket, wherein said electrical cord is animal-proof resisting puncture or cutting by an animal; (ii) a battery pack and one or more batteries sized to supply power to said heating element; or (iii) both (i) and (ii).

* * * * *